Patented Nov. 21, 1950

2,530,772

UNITED STATES PATENT OFFICE 2,530,772

PHENOLIC CONDENSATION PRODUCT

Carl E. Johnson, St. Louis, Mich., and Richard C. Waugh, Boulder, Colo., assignors to Standard Oil Company, Chicago, Ill., a corporation of Indiana No Drawing. Application November 23, 1946, Serial No. 711,828

5 Claims. (Cl. 260—619)

This invention relates to a new composition of matter and a process for making it. It relates more specifically to a phenolic resin intermediate of high molecular weight suitable for the preparation of solid resins for oxidation stabilizers, plasticizers, and for other purposes. One object of the invention is to prepare a viscous liquid or semisolid resin intermediate for the manufacture of resins and plastics which is characterized by low manufacturing cost and acceptably light color. Another object of the invention is to produce a low cost plasticizer for resins, plastics, rubber, etc., characterized by a relatively light color and high miscibility characteristics. Still another object of the invention is to provide an economical method of utilizing the sludges or complexes produced in the refining or conversion of petroleum hydrocarbons with active halide catalysts such as aluminum chloride, boron fluoride and hydrogen fluoride.

In the refining of petroleum, active halide catalysts are frequently used for the polymerization of olefins, e.g. propylene and butylene, for the isomeriztaion of paraffin hydrocarbons, e.g. normal butanes, normal pentane, normal hexane, etc. for the polymerization of cracked gasoline, cracked paraffin wax, and cracked naphthas, generally, for making synthetic lubricating oils, for the alkylation of paraffin hydrocarbons, and for the refining of lubricating oil fractions from crude petroleum. In each of these operations, conducted generally at a temperature between 0° and 400° F., a halide complex or sludge is produced which is usually separated as a lower layer from hydrocarbon products, generally by settling at somewhat elevated temperature. When warm the sludge is a fluid, viscous mass which may readily be pumped thru pipe lines in much the same way heavy oils are pumped. It is highly reactive with water which decomposes it into an acid or halide solution and an unsaturated viscous oil, which is commonly called "red oil." This oil varies in average molecular weight from about 300 to 600. The degree of unsaturation also varies. There are usually at least two double bonds per molecule.

According to our invention, we add to the complex, for example, from anhydrous aluminum chloride treating of hydrocarbons, a substantially anhydrous phenol. For this purpose we prefer to use phenol itself but we may also employ one of the isomeric cresols or a mixture thereof, xylenol or alpha or beta naphthol. We prefer to heat the resulting mixture of phenol and complex at a temperature of about 100 to 175° F. for a period of several hours, then decompose the product by adding water or preferably an alcohol such as methanol or ethanol, or other hydrating agent to hydrate the aluminum chloride. The resulting product separates into an upper oily layer and a lower aqueous or alcoholic layer, the alcohol being recoverable by distillation from the latter. The oily product may be refined by heating, preferably under vacuum, to remove any low-boiling solvents present, if desired. It is a light amber, viscous material miscible with aromatic hydrocarbons, aniline, nitrobenzene and similar polar solvents and soluble in potassium hydroxide in alcohol.

By conducting the reaction at higher temperatures, e.g. 200 to 300° F., the reaction is more rapid but a product of less desirable color is obtained. Lighter colored products are obtained by carrying out the reaction at lower temperatures, e.g. 0 to 100° F. It is preferred to exclude oxygen or air from the reaction and this may be done by the use of inert gas such as nitrogen, $CO_2$ or a hydrocarbon gas.

In one example, an aluminum chloride complex was obtained from the alkylation of isopentane with polypropylene using anhydrous $AlCl_3$ promoted with HCl. The polypropylene had a Saybolt viscosity of 128.5 at 201° F.; gravity—35.8° A. P. I.; and flash—340° F. In preparing the complex, 2500 ml. of polymer and 2000 ml. of isopentane were interacted with 110 grams $AlCl_3$ at 40° F. for fifteen hours, a slow current of HCl gas being passed thru. The $AlCl_3$ complex formed was separated from the hydrocarbon layer. To this complex, phenol was added with agitation at room temperature. A rise in the temperature of about 10° F. indicated a reaction occurring. After subsidence of the temperature, the product was hydrolyzed by the addition of water and a very viscous light orange-colored oil was obtained. This oil was found to be soluble in benzene and in alcoholic potassium hydroxide, indicating its phenolic character. The molecular weight was 540. Alkali solubility indicates free phenolic hydroxyl groups and also the substitution of more than one phenol group per molecule of hydrocarbon in said complex. It exhibited no drying properties on exposure to the air, thus sharply distinguishing it from the so-called red oil ordinarily obtained from the hydrolysis of aluminum chloride sludges. The alkali solubility of the product suggests that more than one phenolic radical is combined with each organic residue in the complex.

The character of the reaction products obtained in our process may be varied considerably depending on the proportion of phenol to aluminum chloride complex employed. The proportions used will depend to some extent upon the amount of organic matter in the complex which will vary in different complexes from about 20 to 70 per cent in the case of $AlCl_3$. If desired, an excess of phenol above the proportions set forth may be employed in the reaction and recovered from the product, preferably by distillation under vacuum.

We prefer to use about one mol of the phenol to each mol of aluminum chloride in the complex, altho this ratio may be varied considerably from about one-fourth to two mols of phenol per mol of $AlCl_3$. In the case of other active halides such as HF or $BF_3$, the same ratio holds except that HF should be considered as the dimer $H_2F_2$ in which form it exists at moderate temperatures.

As indicated hereinabove, the reaction product obtained after decomposing with water or alcohol is light amber in color. If a lighter color is desired this may be obtained by decolorization of the product with fuller's earth, Super Filtrol, silica gel, etc., preferably conducted with the reaction product in solution in benzol, naphtha, or other suitable solvent to reduce viscosity. In the preparation of plastics and resins from our phenolic product, we may bring about the reaction with a suitable aldehyde, for example formaldehyde, paraldehyde or hexamethylene tetramine. For this purpose we may employ an admixture with phenol itself together with the aldehyde and the phenolic condensation product.

The active inorganic halide catalysts of our invention, in which the halogen is combined with only one other element, comprise those halides of metals, related elements, having properties of metals or hydrogen which are strongly hydrolyzed by water and which can then be dehydrated with great difficulty or not at all. Aluminum chloride and hydrogen fluoride are the best examples of such halides. They include the Friedel-Crafts catalysts and are characterized especially by their strong polymerizing action on unsaturated hydrocarbons and catalytic effect in shifting hydrogen atoms in hydrocarbons.

Having thus described our invention what we claim is:

1. The process of preparing a phenolic condensation product which comprises mixing a substantially anhydrous phenol with a hydrocarbon complex prepared by treating an aliphatic hydrocarbon with an active inorganic halide of the Friedel-Crafts type, said complex being essentially a chemical combination of said inorganic halide and an unsaturated hydrocarbon oil having an average molecular weight between about 300 and about 600 and containing at least two double bonds per molecule, the ratio of said phenol mixed with said hydrocarbon complex being selected between about ¼ and about 2 mols per mol of said inorganic halide present in said complex, subjecting the resultant mixture to a reaction temperature between about 0° F. and about 200° F., and separating a phenolic condensation product thus produced.

2. The process of claim 1 wherein said active inorganic halide is aluminum chloride.

3. The process of claim 1 wherein said active inorganic halide is hydrogen fluoride.

4. The process of claim 1 wherein said active inorganic halide is boron trifluoride.

5. The process of claim 1 wherein said reaction temperature is between about 100° F. and about 175° F.

CARL E. JOHNSON.
RICHARD C. WAUGH.

REFERENCES CITED

The following references are of record in the file of this patent:

UNITED STATES PATENTS

| Number    | Name          | Date           |
|-----------|---------------|----------------|
| 1,877,664 | Howes         | Sept. 13, 1932 |
| 1,965,952 | Zorn et al.   | July 10, 1934  |
| 2,061,111 | Stevens et al.| Nov. 17, 1936  |
| 2,123,898 | Honel et al.  | July 19, 1938  |
| 2,154,192 | Zinke         | Apr. 11, 1939  |
| 2,343,845 | Powers        | Mar. 7, 1944   |
| 2,388,583 | Ward          | Nov. 6, 1945   |
| 2,400,521 | Kuhn, Jr.     | May 21, 1946   |